Oct. 11, 1932. A. HERZ 1,881,573
ANTIINDUCTION SHIELDING SYSTEM
Filed July 29, 1929 2 Sheets-Sheet 1
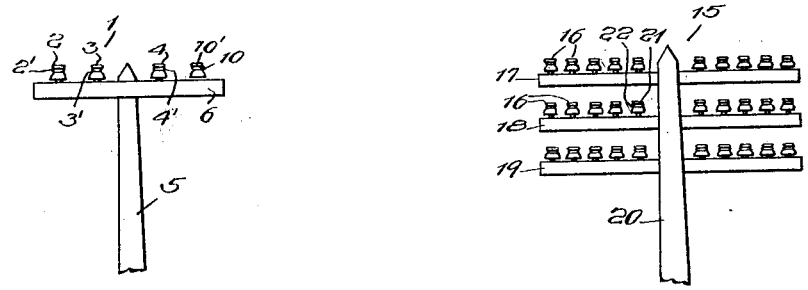
Fig. 1.
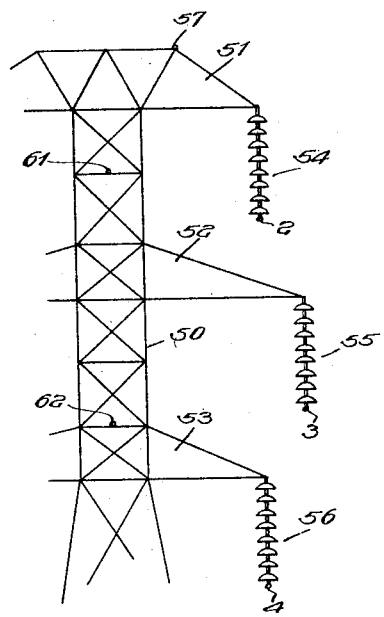
Fig. 2.
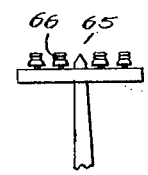
Witness:
William P. Kilroy
Inventor:
Alfred Herz
By Brown Jackson Boucher Dennee
Attys

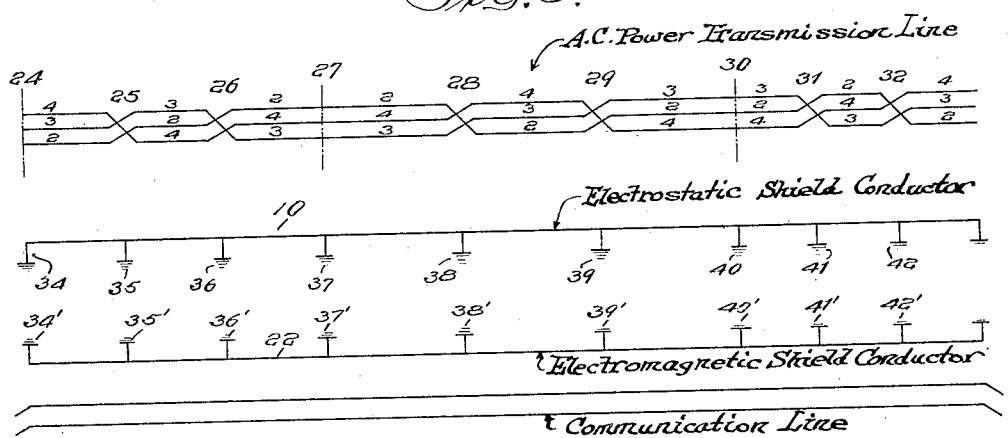
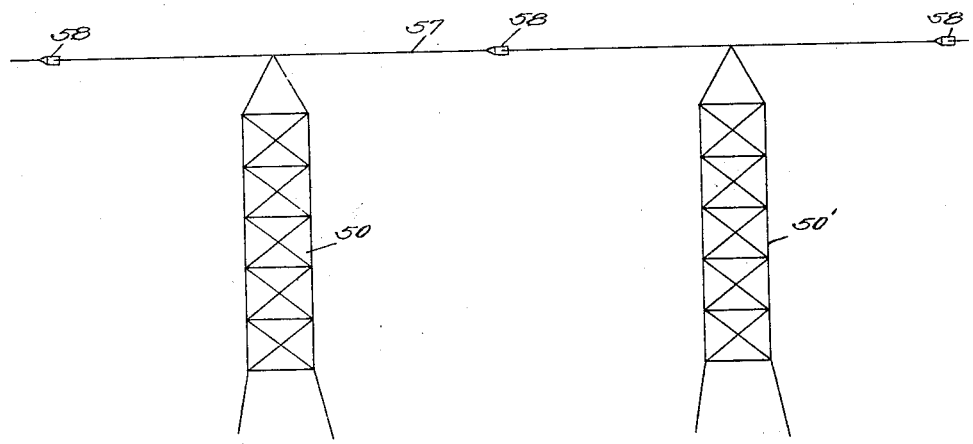

Patented Oct. 11, 1932

1,881,573

UNITED STATES PATENT OFFICE

ALFRED HERZ, OF CHICAGO, ILLINOIS

ANTIINDUCTION SHIELDING SYSTEM

Application filed July 29, 1929. Serial No. 382,025.

My invention relates to method of and means for reducing the disturbing effect of a power circuit upon adjacent communication circuits. It is known that where a telephone, telegraph, signal or other communication circuit parallels a power line the communication circuit is subject to disturbances which are exceedingly hard to eliminate. The disturbances to which I refer are not mere noise producing disturbances such as the 60 cycle hum of power current upon a telephone receiver, but far more serious and dangerous disturbances, for example, the presence of voltages upon the wires of the communication circuits great enough to endanger the operation of the circuits or connected apparatus, either by excessive flow of current or by breakdown of the insulation, or to occasion injurious or fatal shock to workmen. My problem, therefore, is not that heretofore occasioned by noises and the like induced upon telephone lines and the like, but the elimination or prevention of dangerous potentials from communication circuits which are designed for and insulated only to withstand relatively low potentials and small current flows.

The transposition of either the power conductors or of the communication wires has been practiced but this does not provide a satisfactory solution of the problem. There are several reasons for this.

It is to be remembered that transpositions being expensive to make are separated by considerable distance and, hence, the balance of disturbing effect of the power wires upon the communication circuit wires is only a rough approximation.

Usually the power wires and communication wires are so mounted that the spacing and, hence, induction of the various wires with respect to each other is not uniform. Also it is to be remembered that there are two conditions of an electric power line which must be taken into account, namely, the normal condition of transmitting power and the abnormal condition prevailing during fault conditions.

Thus assume a three phase power line transmitting power. If the load were absolutely balanced on the three phases and transposition were perfect, i. e., the effect of the three phases upon an adjacent communication circuit balance, the disturbance would be a minimum, but as soon as a fault to ground occurs there is an unbalanced load and transposition of the power wires is ineffective to prevent the disturbing effect.

It is further to be observed that a high tension circuit causes disturbances of two different kinds. A high tension wire has a disturbing electrostatic effect due to the potential upon it and the consequent disturbance of the ether. This electrostatic effect is due not only to the normal cyclical variations of voltage but to the numerous and unaccountable potential disturbances which occur upon transmission lines.

The second disturbing effect is electromagnetic and is due to the flow of electricity. Its greatest effect is exhibited as electromagnetic induction. Now these two kinds of disturbances which are out of phase with each other, theoretically 90°, are present during normal transmission as well as during fault conditions.

In counteracting the effect which a power line has upon a communication circuit it is not commercially feasible to eliminate all of the disturbance, but if the induced voltage on the communication circuit can be prevented from rising above a certain value at any point on the system, the communication circuits may be continuously operated.

The signalling conductors are insulated only for relatively low voltages and the normal operating currents of the apparatus connected to the line are of relatively low magnitude. If the potential is kept so low as to avoid breaking down the insulation of the line or causing dangerous shock to workmen, or of causing current flow through the apparatus of a magnitude which will be in excess of operating currents, the signalling system can continue to operate.

I am aware that it has been attempted heretofore to overcome the disturbing effect of a power line upon a communication circuit by carrying a grounded conductor upon either the power wire poles or upon the communication circuit poles. So far as I am aware such schemes have not proven adequate or satisfactory although the art has long and insistently demanded some scheme which will furnish relief.

It appears that such previous attempts have been proposed under an imperfect comprehension of the problem.

In the preferred form of my invention I mount in proximity to the communication circuit, i. e., in relative close coupling therewith, a shield wire of low resistance grounded at intervals which preferably correspond to the points of transposition of the power wires. The power wires are transposed in known manner. If desired, the grounded connections may be put at the points of transposition of the communication wires where such transposition is employed. This shield wire is preferably inductively related to or relatively closely coupled with the communication circuit wire to be acted upon, and relatively loosely coupled inductively with the power wire.

The theory is that the electromagnetic inductive effect of the power line will induce a flow of current of substantially equal or greater value in the shield wire than in the wire of the communication circuit. It can be seen that if the inducing effect upon both wires by the electromagnetic disturbance of the power current is the same and the resistance of the shield wire is low and it is well grounded at numerous points the situation is precisely like a transformer having two secondary windings one of which is of low resistance and is short circuited. The large counter flow of current in the shield wire acts in opposition to the inducing force and substantially neutralizes it. The distance between points where the shield wire is grounded determines the voltage and, hence, the actual value of current flow in said shield wire.

The concept of a short circuited secondary effect of this shield wire and the teaching that the shield wire should be of low resistance and formed into loops of short length by frequent grounds is disclosed and claimed in my copending prior application, Serial No. 254,706, filed Feb. 16, 1928. The idea of having these grounds substantially coincide with the points of transposition is a novel and useful improvement in carrying out the basic idea disclosed in said prior application.

Upon the occurrence of fault current flow in the power line the low resistance shield wire has an additional effect, namely, that due to its connection in parallel with the grounded return circuit it forms an actual metallic path for a part of the return current flow.

Thus in addition to its function of acting as a short circuited winding between the inducing power wire and the communication circuit wire, it carries part of the return current in a direction opposite that prevailing in the power wire as disclosed in my prior application. Thereby it further diminishes the electromagnetic effect of the power wire on the communication wire.

But the above protection against electromagnetic disturbance is only part of the system of my present invention, as electrostatic disturbance is not thereby precluded.

Obviously, the interposition of the low resistance grounded conductor assists in maintaining the effect of a ground shield adjacent the communication wire but as in the previouse discusson it was pointed out that the effect of the power wire upon the low resistance shield wire and the communication wire was about equal it can be seen that the location of the said shield wire is not best for shielding the communication wire from the electrostatic effect of the power wire.

According to my invention I provide, in addition, an electrostatic shield wire in proximity to the power wire. This wire may be, like the first shield wire, a continuous conductor grounded at frequent intervals, preferably at points corresponding to points of transposition in the power circuit so as to devote different sections to different electrostatic phases, or it may consist of a series of conductor lengths separated by insulators, and having grounded taps preferably at points corresponding to the transposition points of the power wire preferably midway of such conductor lengths for the same purpose.

This electrostatic shield wire has the chief duty of providing a ground potential in close proximity to the power wire. Thereby it serves first to reduce the effect of atmospheric electrostatic disturbances upon the power wire and, second, it serves to reduce the electrostatic effect of the power wire with respect to the communication wire.

It is peculiarly true within my experience that the electro-magnetic shield wire is more effective in proximity to the communication wire and the electrostatic shield wire is more effective when in close proximity to the power wire.

If the electromagnetic shield wire were placed in close proximity to the power wire, it would be required to carry a current substantially equal in value to the current in the power wire in order to neutralize the electromagnetic effect of the power wire. By placing it in proximity to the communication wire it need carry only substantially as much as will neutralize the electromagnetic field caused to exist near the communication wire by the power wire.

In regard to the electrostatic shield wire it is to be noted that its effectiveness is quite the reverse. By interposing the grounded electrostatic shield wire near the source of electrostatic disturbance the shielding effect is greatly increased relative to the communication wire.

As above pointed out, the electrostatic shield wire need not carry any appreciable dynamic current to be effective as a shield wire since its function is to control the electrostatic field. It may, therefore, be broken up into separate sections. If it is made continuous it may perform some of the functions of the electromagnetic shield wire, but it is less effective. It may also, if continuous, serve to provide a return path for fault current thereby minimizing the inductive effect of fault current flow.

The electrostatic shield conductor, whether continuous or divided into sections, has also the important function of shielding the power wire from disturbances due to atmospheric electrical disturbances. Likewise the electromagnetic shield wire performs the same important service for the communication wires.

While the ideal location for the shield wires so far as interaction between power wires and communication wires is concerned, is directly between such power wires and communication wires, each shield wire near its corresponding conductors, I have found that commercially satisfactory results are obtainable by the location of the shield wires upon the same supporting structures as such power wires and communication wires, respectively.

In the preferred embodiment of my invention the power wires are transposed in known manner. The electromagnetic shield wire is of low resistance and is preferably continuous and provided with good ground connections at points registering with the points of transposition, or where a double length of power wire is placed between transposition connections, then at the central or nodal point of such double length section. Thus the electromagnetic shield wire comprises a series of closed loops or rings of low resistance. The phase of current flowing in the loops is different because of the transposition of the power wires and the controlling influence of the nearest phase wire of the power circuit.

I believe that the discontinuous grounded electrostatic shield wire of my invention is broadly new for general use in power work.

Good electrical grounds are essential to satisfactory operation of the system and to insure the same I may bury a ground wire of greater or less extent at the foot of the ground connections or taps or run a continuous metallic return grounded or ungrounded connected at the foot of said taps to secure the desired effect of closed electrical loops or rings.

Now in order to acquaint those skilled in the art with the manner of constructing and operating a system embodying my invention, I shall describe in connection with the accompanying drawings an embodiment of the same.

In the drawings:

Figure 1 illustrates diagrammatically the relative locations of a power line and an adjacent communication line and the relative locations of the shielding conductors;

Figure 2 shows my shielding conductors as applied to a very high voltage system;

Figure 3 is a diagrammatic circuit diagram showing the location of the grounding points on the shielding conductor with respect to the transposition points; and Figure 4 is a fragmentary view showing the manner of insulating the sections of the overhead ground wire in a transmission system such as is shown in Figure 2.

Reference may now be had more particularly to Figure 1. In this figure a power line 1 comprising three conductors 2, 3 and 4 supported by insulators 2', 3' and 4' respectively is supported in the usual manner from a number of poles, one of which is indicated in Figure 1 at 5. A cross-arm 6 supports the insulators 2', 3' and 4' and thereby supports the line conductors. This is a system wherein the line conductors are all mounted in a horizontal plane.

The conductors 2, 3 and 4 are transposed at various points along the line, in a manner well known in the art, to prevent both the power hum and undue voltages being induced in adjacent telephone or other communication lines. An electrostatic shielding or screen wire 10 is mounted upon an insulator 10' which is supported upon the cross-arm 6. This screen wire extends parallel to the power conductors 2, 3 and 4.

Adjacent the power line there may be a telegraph, telephone, signal or like communication line or lines indicated in general at 15 which may parallel the power line for greater or lesser distances. The communication lines which may comprise for example pairs of conductors for a full metallic circuit are indicated as supported upon insulators 16 mounted on the cross-arms 17, 18 and 19 which are in turn supported upon the usual pole structure indicated diagrammatically at 20.

On one of the insulators indicated at 21 I support an electromagnetic shielding or screen wire 22. This screen wire is a conductor of low resistance which extends parallel to the communication conductors and is carefully grounded at a number of points along its length. The electromagnetic shielding conductor or screen wire 22 preferably but not necessarily, extends centrally of all of the communication conductors to be shielded. A low resistance path in each loop of the said electromagnetic shielding wire is highly desirable and if good ground connections are not available it is advisable to resort to a metallic return wire connected to the foot of the taps which I have shown in Figure 3.

Reference may now be had more particularly to Figure 3 showing the transposition of the power conductors and the preferred location of the grounding points upon the shielding conductors.

The power line conductors 2, 3 and 4 are shown as being transposed at a number of points. The distance between transposition points is determined by local conditions in a manner well known in the art. The transposition points are indicated at 25, 26, 28, 29, 31, 32, etc. It is to be noted that the distance from the point 26 to the point 28 is equal to the sum of the distances from the point 25 to 26 and 28 to 29. In a like manner the distance between the transposition points 29 and 31 is equal to the sum of the distances between the points 28 and 29 and between the points 31 and 32 electrically coordinated.

The distance between the points 24 and 27 is equal to three times the distance between the points 25 and 26 and in a like manner, the distance between the points 27 and 30 is equal to three times the distance between the points 28 and 29. The length of power line between the points 24 and 27 may be said to constitute one "barrel". The length 27 to 30 constitute another "barrel", etc. In each barrel the three power conductors occupy the three successive positions for equal lengths hence, other factors being equal, the inductive effect upon adjacent communication lines insofar as the power hum is concerned is intended to be substantially neutralized. In effect the three conductors are twisted about each other for a complete turn in one "barrel" and then twisted back a complete turn in the next "barrel". The different barrels may be of different lengths as conditions require. At the points 24, 27, 30, etc., which are the juncture points between adjacent barrels, the transposition of the power conductors is omitted. These points are, however, in effect the equivalent of transposition points because of the reversals of twisting.

The electrostatic shielding conductor 10 is grounded at each of the transposition points and at points that are the electrical equivalent of transposition points. These grounding points are indicated at 34 to 42, inclusive.

The electromagnetic shielding conductor 22 adjacent the communication line is likewise grounded at each of the transposition points and at points that are the electrical equivalent of transposition points. These grounding connections are indicated at 34' to 42' inclusive.

While in the preferred embodiment of my invention the two screen wires are employed, certain of the advantages of the invention may be secured with the use of only one of these wires, and more particularly the wire 22 is highly useful alone for certain conditions particularly when the disturbance is mainly electromagnetic.

During normal conditions of current flow in the power wires, the electromagnetic shielding wire 22 and the electrostatic shielding wire 10 perform the functions above recited.

Should a fault to ground occur upon any one of the phase conductors the return flow of current will be partly in the ground and partly in both grounded conductors 10 and 22. This return current flow will occur mainly in the conductor 10 because of its proximity to the fault. Such return flow current in conductor 10 has an electromagnetic influence upon the communication wire opposite in effect to that produced by the outgoing flow of current on the phase wire. Since the grounded shield wire is grounded at intervals, it comprises low resistance closed loops which may have circulating current of relatively high value induced in them. The electromagnetic effect of such circulating induced currents is in general opposite to the effect of the outwardly flowing fault currents.

As an indication of the effects produced by the two shielding conductors and the difficulty of analyzing the problem, the following may be mentioned. In one experiment performed, I found that by using the electrostatic shield wire 10 adjacent the power wire without any shielding conductor adjacent the communication line, there was a reduction of 53% in the induced voltage over what was induced in the absence of both shielding conductors.

This shielding wire apparently performed both functions, as an electrostatic shield and as an electromagnetic shield, as will appear from the following facts. On the same line there was a reduction of 44% in the induced voltage when the electromagnetic shielding conductor 22 adjacent the communication line was used and no electrostatic shielding conductor was used adjacent the power line. When both shielding conductors 10 and 22 were used, it was found that there was a reduction of 53% in the induced voltage which is the same effect as was produced by the electrostatic shield wire 10 without the use of the electromagnetic shield wire 22.

In another experiment it was found that by using a shield wire such as 10 adjacent the power line with no shielding wire such as 22 adjacent the communication line, there was a reduction of 25% in the voltage induced in the communication line and, under like conditions, there was a reduction of 35% in the voltage induced in the communication line when the shielding wire 22 adjacent the communication line was used with no shielding wire, such as 10, adjacent the power line. When both shielding wires were used, there was a reduction of 51% in the induced voltage in the communication line.

In another experiment that has been performed wherein the shield wire such as 10 adjacent the power line was not properly located with respect to the line there was an increase of 315% in the voltage induced in the communication line.

I have found that with power conductors arranged as in Figure 1, the best shielding effect is produced by placing the shielding conductor upon the same cross-arm that supports the power conductors and between the power line and the communication line.

Reference may now be had to Figure 2 showing a high voltage power line wherein the conductors are arranged in substantially a vertical plane.

In this form of transmission system, a tower is indicated at 50, said tower having cross-arms 51, 52 and 53 all of the usual trussed construction. The high voltage line conductors 2, 3 and 4 are suspended from the cross-arms 51, 52 and 53 in the usual manner by means of high voltage insulators 54, 55 and 56. A grounded conductor 57 extends parallel to the line conductors 2, 3 and 4 being supported by the cross-arm 51 and grounded at each of the supporting towers. This grounded conductor is provided in transmission systems such as these for the purpose of maintaining a ground potential above the power conductors. It is to be noted that the usual form of grounding conductor as indicated at 57 is in effect the same as an electrostatic shielding conductor in that it is grounded at a large number of points along its length. It is, however, found that the location of this grounding conductor is such that it not only does not have any shielding effect but on the contrary is effective to increase the voltage induced in the adjacent communication system.

This is due to the fact that current can flow through the conductor 57 between adjacent grounding points, said current being induced in that conductor by current flowing in the power conductors. I place an insulator in each section of the grounded conductor 57 between adjacent ground points and thereby prevent the flow of current through the grounded conductor 57 between adjacent grounding points. In this manner I eliminate the objectionable effects produced by this conductor upon adjacent communication lines, but preserve its function as an electrostatic shield.

In Figure 4, I show at 50 and 50′ a side view of two adjacent towers of the power system shown in Figure 2. The overhead grounded conductor 57 is grounded at each of the towers 50 either by a ground tap or through the towers and has insulators 58 interposed between adjacent towers. The portion of the grounding conductor on each side of the respective insulators 58 is grounded at its supporting tower and is electrically separated from the adjacent portions of the conductors 57 by the insulator.

In the high tension transmission system shown in Figure 2, I mount either one or two electrostatic shielding conductors, either continuous or, preferably, sectionalized. I mount those conductors as indicated at 61 and 62. The communication system to be protected by those conductors is indicated at 65 and the grounded electromagnetic shield wire for the communication system is preferably located as indicated at 66, the other conductors shown being communication conductors.

The electric circuit for the power conductors 2, 3 and 4 of Figure 2 is identical to that of Figure 1, being as shown in Figure 3 of the drawings. The shielding wires are to be grounded at the transposition points or at points equivalent electrically to transposition points.

It is to be noted that the power lines are transposed so that each phase wire is closest to the communication circuit for one-third of the total distance throughout the exposure.

This may, if the exposure is quite lengthy, produce comparatively high voltage in each "side" of the "barrel." The voltage induced in the communication wire from a "side" of the "barrel" is out of phase with the voltage induced from the next "side" of the "barrel," therefore, theoretically, at the end of the third "side" the net results should be zero. However, practically, this ideal condition is rarely, if ever, arrived at. This is partially due to the slight changes in physical separation between the systems in various parts of the exposure, and, furthermore, it may be due to variations in height not occurring coincidentally on both systems. Furthermore, shielding effects from neighboring fences, railroad tracks, trolleys, etc., appear to have some effect. Consequently, at the end of the "barrel," or at the end of each exposure, there is always a remnant of voltage and this remnant is the quantity which must be either reduced or substantially eliminated. Naturally, if shield wires are used, the voltage induced through each section is materially reduced. Consequently, the remnant is also reduced and is usually found within bounds of safety and possibility of operation.

In one experiment performed the induced voltage per section was in the order of 6 volts and the remnant remaining at the end of the "barrel" was in the order of 2¼ volts. This was through nine miles of exposure only, and if the test had been extended through the entire length of the exposure, voltages of such value as might hinder the operation of high speed telegraph apparatus would probably have been encountered.

In the accompanying claims, when reference is made to the grounding of the shielding conductors at the transposition points it is to be understood that I mean points of actual transposition as well as points that are the electrical equivalent of transposition points, such as the points 24, 27 or 30 of Figure 3.

In compliance with the requirements of the patent statutes, I have herein shown and described a preferred embodiment of my invention together with certain modifications which I consider as equivalents within my invention as herein claimed. The invention is not to be considered as limited to the precise details herein shown. What I consider new and desire to secure by Letters Patent is:

1. In an electric system wherein an alternating current power line and a communication line parallel one another, the conductors of the power line being transposed at a number of points, means for preventing a number of points, means for preventing the induction of excessive voltages in the communication line due to current flowing in the power line, said means comprising a conductor parallel to the power line and grounded at the transposition points.

2. In an electric system wherein an alternating current power line and a communication line parallel one another, the conductors of the power line being transposed at a number of points, means for preventing the induction of excessive voltages in the communication line due to current flowing in the power line, said means comprising a conductor parallel to the power line and grounded at the transposition points and another conductor parallel to and adjacent the communication line and grounded at the transposition points.

3. In combination, an insulated power carrying conductor, an insulated signalling conductor, a grounded electrostatic shield wire comprising a plurality of sections disposed between said conductors and adjacent the first conductor, insulators separating said sections for preventing current flow between adjacent sections and a grounded current carrying induction shield wire of relatively low resistance disposed in effective inductive relation adjacent the second conductor.

4. A system of the class described comprising an alternating current power line having conductors, a communication line having conductors, a grounded electrostatic shield wire in closely coupled electrostatic relation to the power conductors and loosely coupled electrostatically relatively to the communication conductors, insulators separating said shield wire into sections and preventing current flow through adjacent sections, and a grounded current carrying electromagnetic shield wire closely coupled electromagnetically to the communication wire and loosely coupled electromagnetically to the power wire.

5. A system of the class described comprising an alternating current power line having conductors, said conductors being transposed, a communicating line having conductors influenced electromagnetically and electrostatically by said power line, an electrostatic shield wire adjacent the power conductors, and an electromagnetic shield wire adjacent the communication conductors, said shield wires having ground connections at intervals corresponding to the points of transposition.

6. A system of the class described comprising in combination with an A. C. multiphase power transmitting line comprising a plurality of insulated metallic conductors, of an insulated signalling conductor substantially paralleling the power line for a sufficient distance that when it is subjected to the inductive effect of unbalanced current flow in the power line a potential will tend to be induced upon said signalling conductor which will interfere with the operation thereof, said conductors of the power line being transposed to neutralize the effect of normal current flow upon the signalling conductor and shielding means interposed between the power line and the signalling conductor, said shielding means being of relatively high current carrying capacity and having highly conductive ground taps substantially registering with the points of transposition of the power wires forming a plurality of closed loops of low resistance, said loops being of a phase controlled by the inductive effects of the parts of the line between transpositions, each loop being adapted to carry sufficient current and of suitable phase in opposition to the inducing effect of that part of the power line with which it is in substantial register that the sum of the potentials on the signalling conductor induced by the parts of the power line will be limited to such a value as not to interrupt the operation of the signalling wire.

7. A system of the class described for preventing the electromagnetic and the electrostatic effects of an electric power transmission system from interrupting the operation of an adjacent communication system, which comprises the combination of a threephase A. C. power transmitting line, said line comprising a plurality of insulated metallic power carrying conductors, said conductors being transposed at suitable points, an insulated signalling conductor adjacent the power line, said signalling conductor being insulated for relatively low voltage only and adapted to employ currents of relatively low magnitude, said signalling conductor extending along the power line and being subject to the electrostatic and electromagnetic induction of said power line to such an extent that potentials tend to be induced in said signalling conductor in excess of its insulating value or tending to cause abnormally large current flow therein, electrostatic shielding means adjacent the power conductors comprising a series of conductor sections individually grounded, and electromagnetic shielding means adjacent the signalling conductor, said latter means being of sufficient conductivity that the current flow induced therein by the unneutralized electromagnetic field of the power conductors will set up a magnetic field in opposition to the inducing field, limiting the voltage induced upon the signalling conductor to a value safe for the signalling conductor, said electromagnetic shielding means comprising a conductor having taps of low resistance leading directly to ground, said taps being located in substantial register with the points of transposition of the power conductors to provide loops which will carry current of a phase corresponding to the unneutralized field of the corresponding transposition section of the power line.

8. A system of the class described, comprising a threephase power line the wires of which are at a high potential with respect to ground and are insulated therefrom, a signalling line having wires of low potential with respect to ground and insulated therefrom, an electrostatic shield wire consisting of a series of sections each maintained at ground potential relatively closely coupled with the signalling line, said sections being conductively separated to keep the induced potential thereupon from setting up appreciable current flow, and an electromagnetic shield wire having a series of grounded taps forming a series of low resistance closed circuit loops relatively closely coupled with the signalling line and relatively loosely coupled with the power line.

9. The combination with an electric power line comprising spaced supports and power conductors carried in insulated relation upon said spaced supports, of an electrostatic shield conductor also carried by said supports in spaced substantially parallel relation to said power conductors, said electrostatic shield conductor being divided into sections and each section being provided with a low resistance ground connection to conduct electrostatic disturbances freely to ground but hindering longitudinal travel of current.

In witness whereof, I hereunto subscribe my name this 15th day of July 1929.

ALFRED HERZ.